Figure 2:
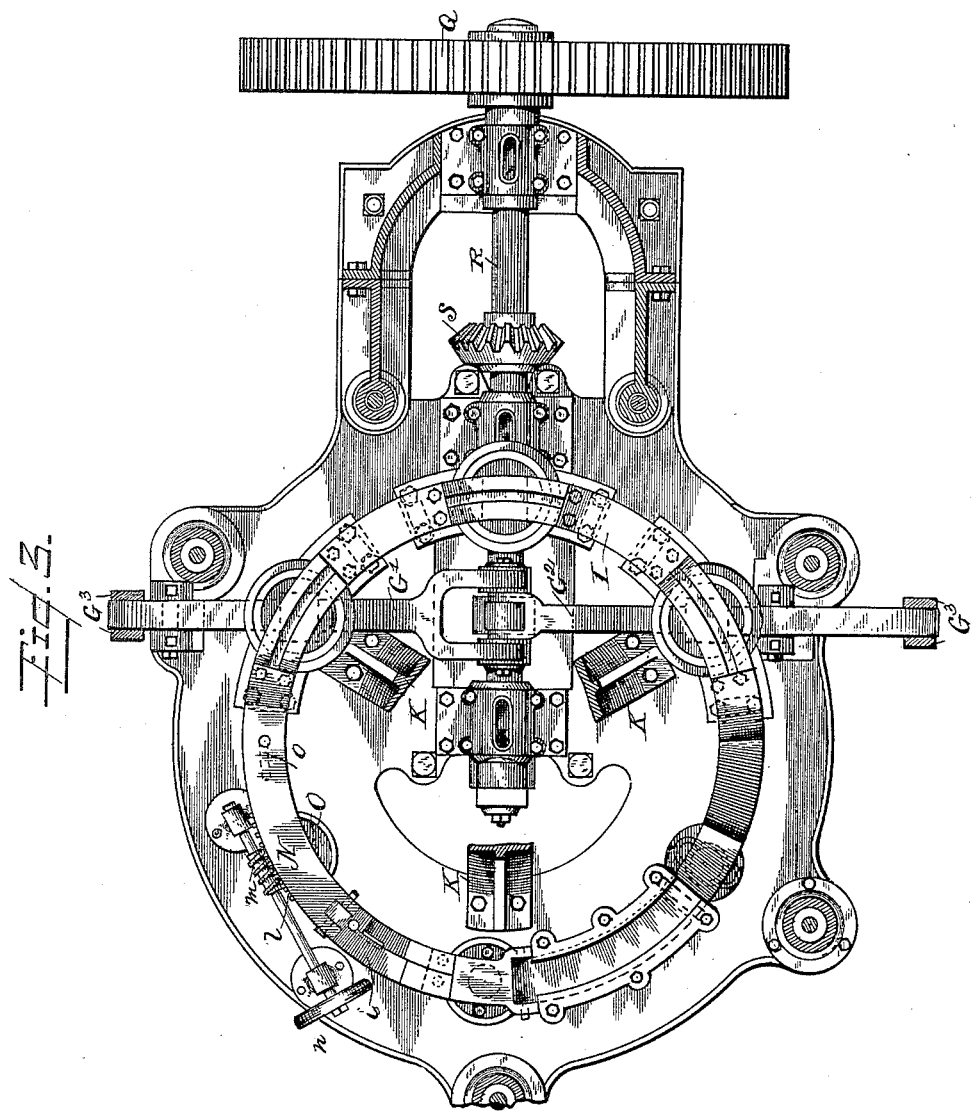

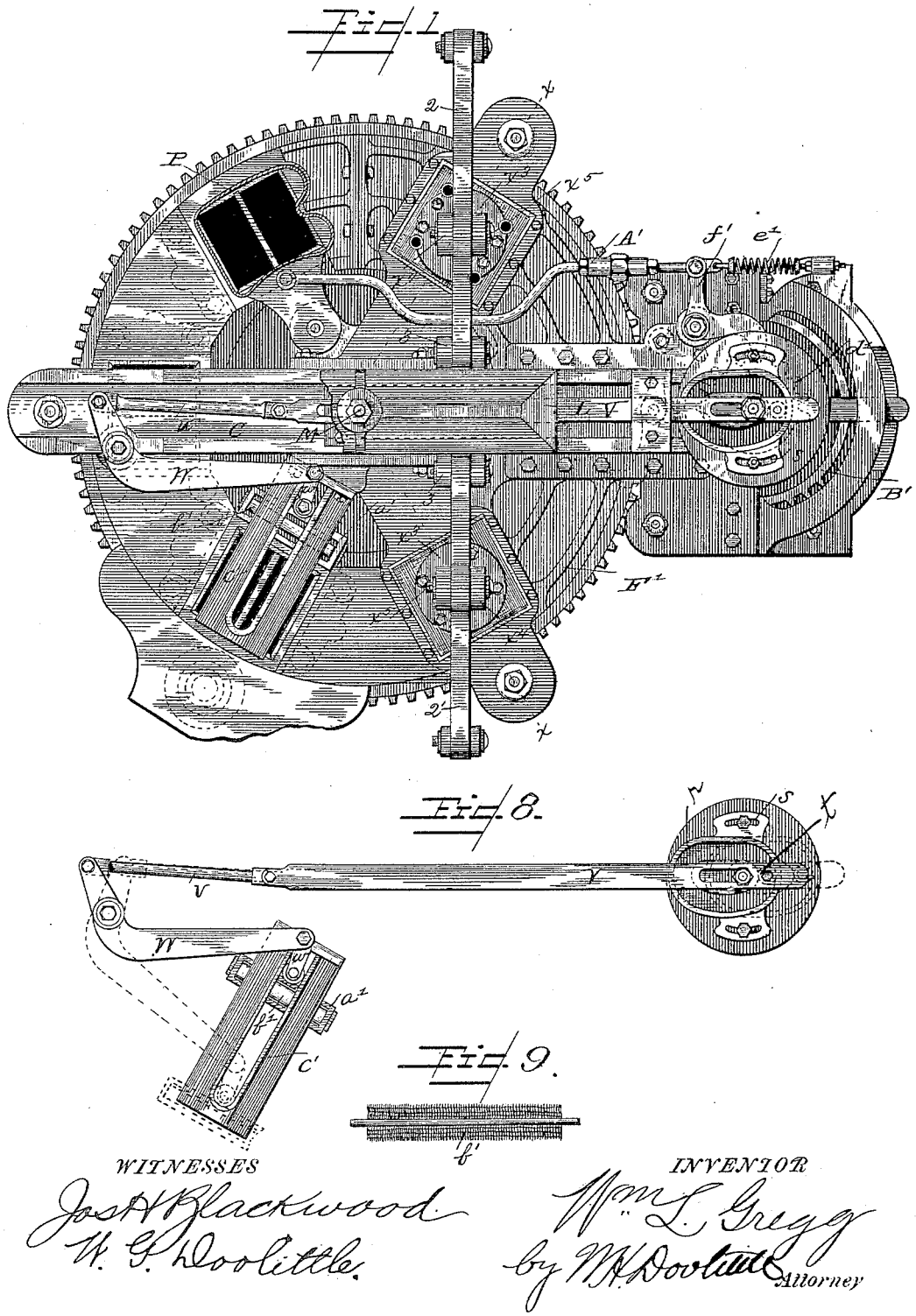

(No Model.) 6 Sheets—Sheet 2.
W. L. GREGG.
BRICK MACHINE.
No. 419,042. Patented Jan. 7, 1890.
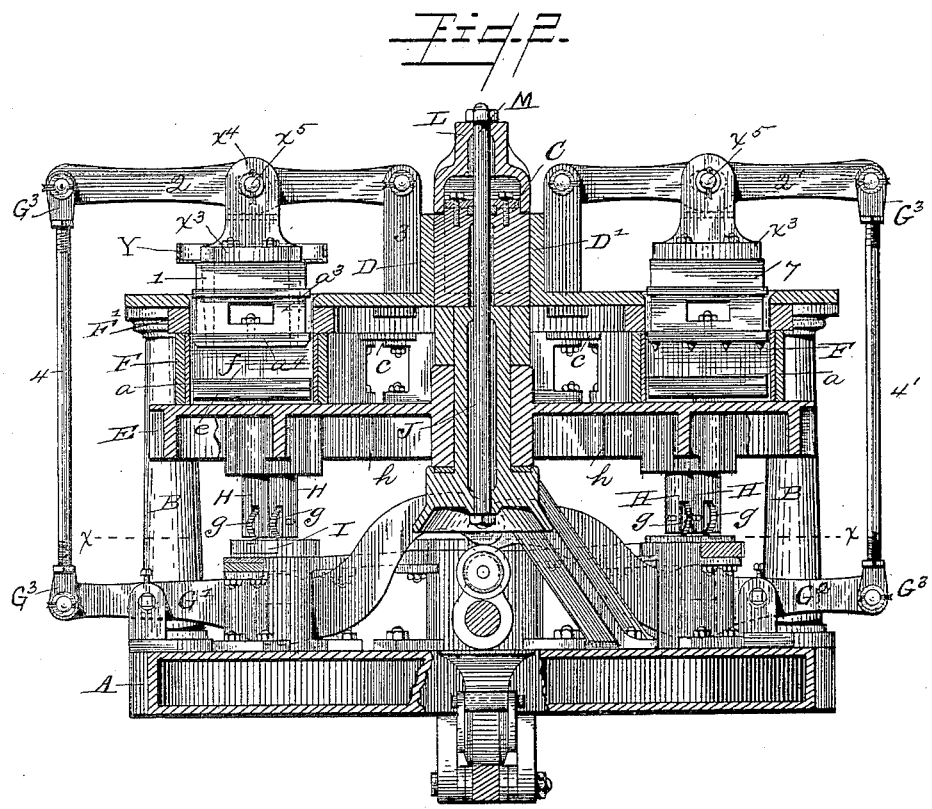
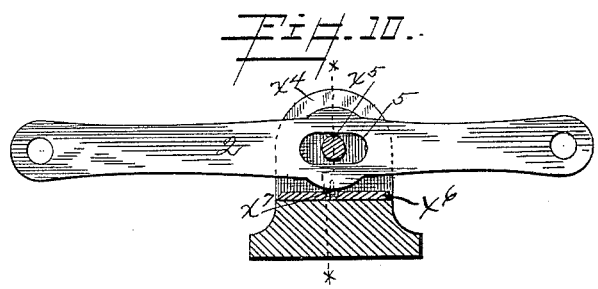
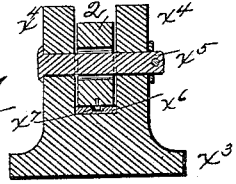
WITNESSES
Jos. H. Blackwood
W. S. Doolittle.
INVENTOR
Wm L. Gregg
Wm H. Doolittle
Attorney
N. PETERS, Photo-Lithographer, Washington, D. C.

(No Model.) 6 Sheets—Sheet 3.

W. L. GREGG.
BRICK MACHINE.

No. 419,042. Patented Jan. 7, 1890.

WITNESSES
Jos H Blackwood
W. S. Doolittle.

INVENTOR
Wm L. Gregg
by Wm H Doolittle
Attorney (No Model.) 6 Sheets—Sheet 4.
W. L. GREGG.
BRICK MACHINE.
No. 419,042. Patented Jan. 7, 1890.
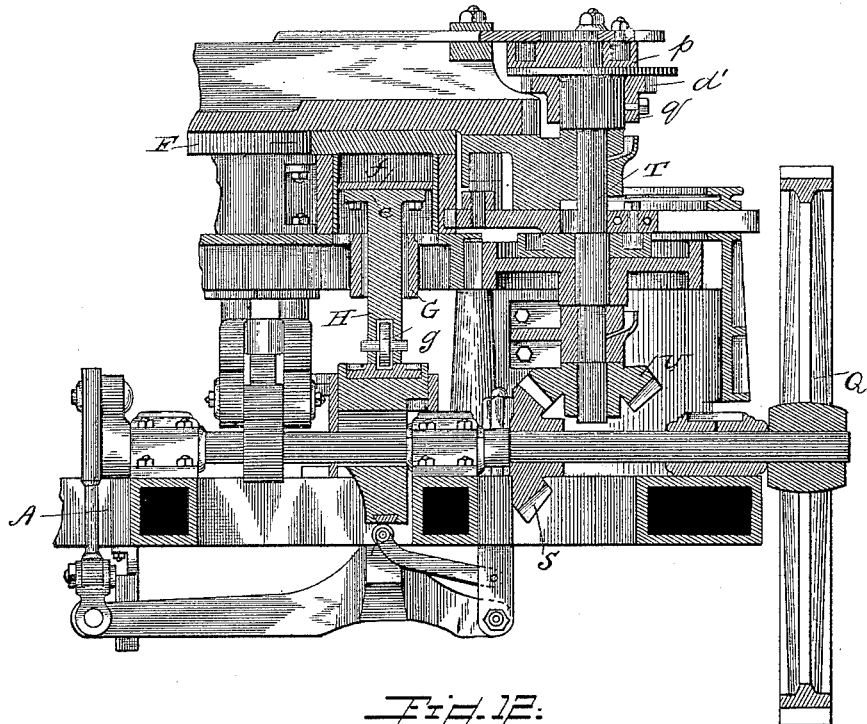
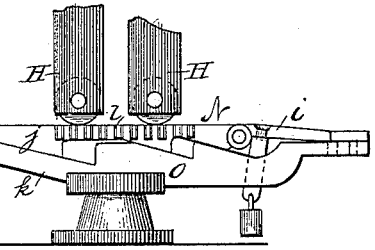
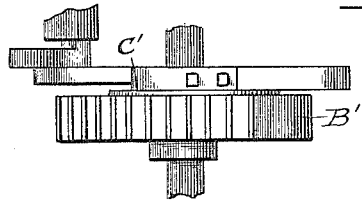
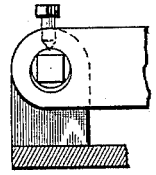
WITNESSES
Jas H Blackwood
W G Doolittle
INVENTOR
Wm L Gregg
by Wm H Doolittle
Attorney (No Model.) 6 Sheets—Sheet 5.
W. L. GREGG.
BRICK MACHINE.
No. 419,042. Patented Jan. 7, 1890.
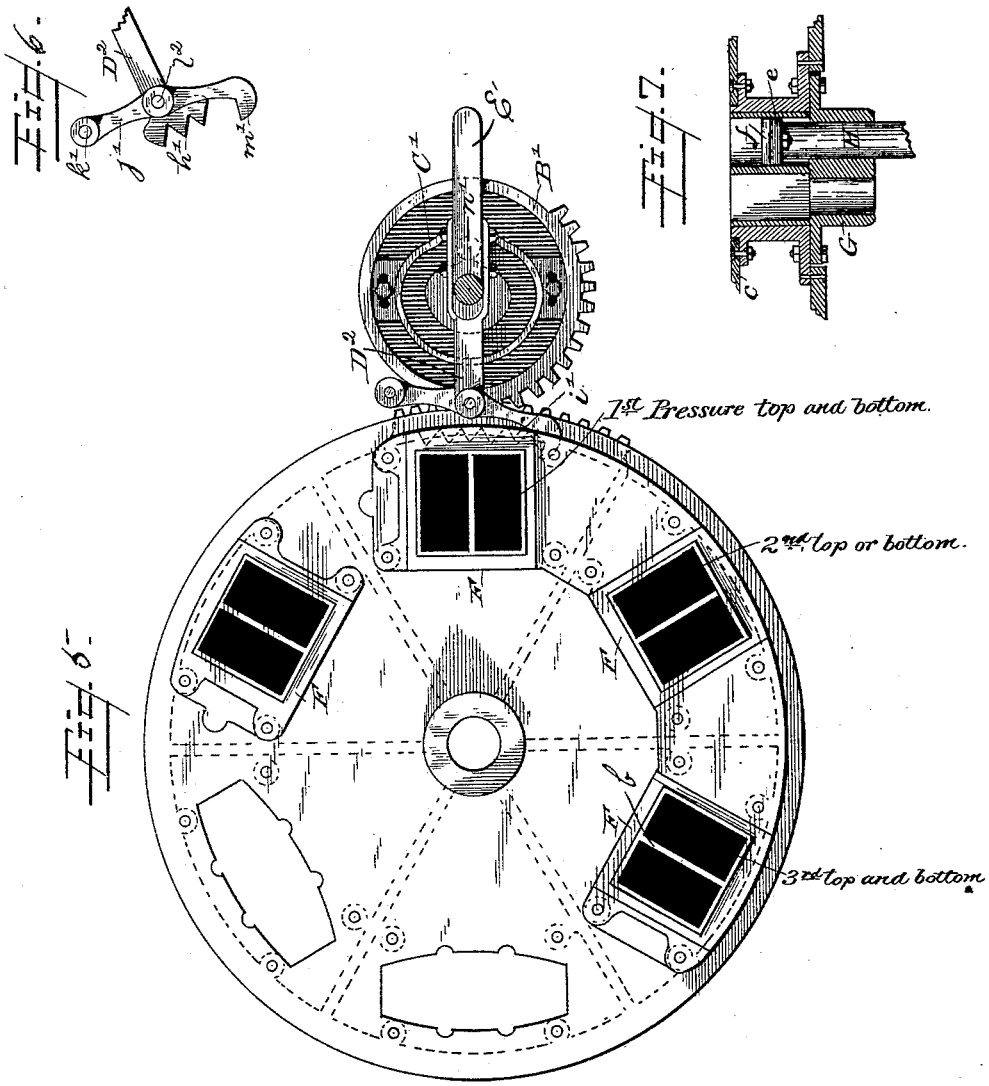
WITNESSES
Jos H Blackwood
W S Doolittle
INVENTOR
Wm L Gregg
by Wm H Doolittle
Attorney (No Model.) 6 Sheets—Sheet 6.
W. L. GREGG.
BRICK MACHINE.
No. 419,042. Patented Jan. 7, 1890.
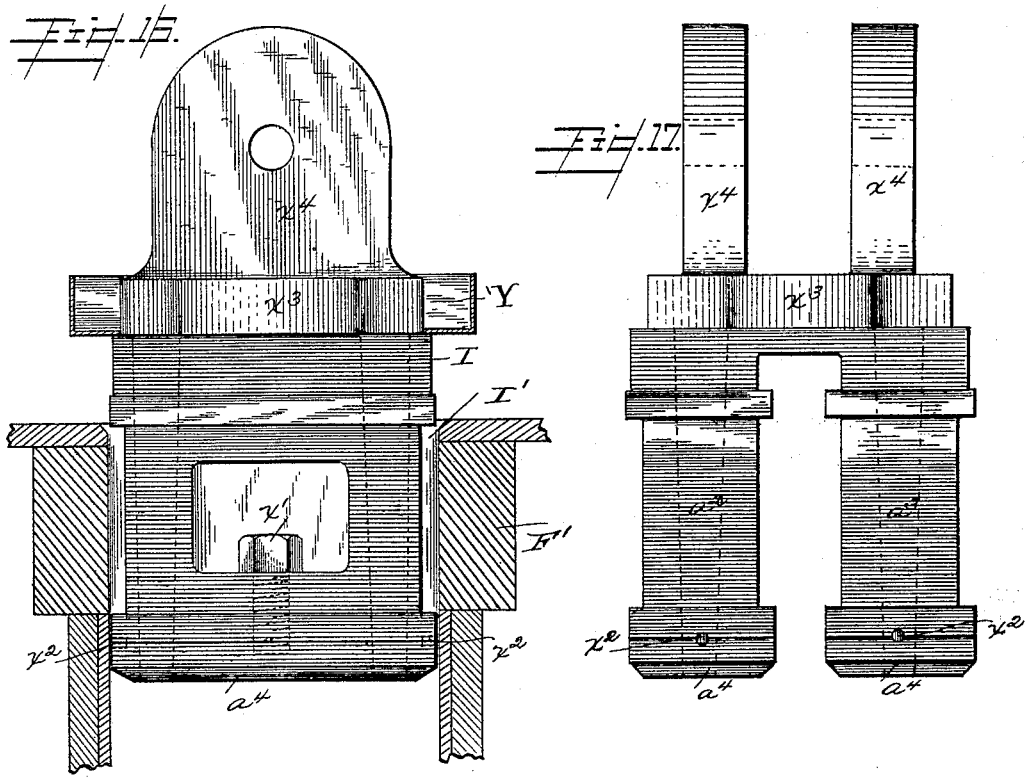
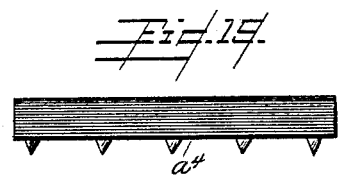

UNITED STATES PATENT OFFICE.

WILLIAM L. GREGG, OF PHILADELPHIA, PENNSYLVANIA.

BRICK-MACHINE.

SPECIFICATION forming part of Letters Patent No. 419,042, dated January 7, 1890.

Application filed June 11, 1889. Serial No. 313,905. (No model.)

*To all whom it may concern:*

Be it known that I, WILLIAM L. GREGG, a citizen of the United States, residing at Philadelphia, in the county of Philadelphia and State of Pennsylvania, have invented certain new and useful Improvements in Brick-Machines; and I do hereby declare the following to be a full, clear, and exact description of the invention, such as will enable others skilled in the art to which it appertains to make and use the same.

My invention relates to improvements in the manufacture of brick.

The object of this invention is to produce by the operation of a single machine a brick of superior quality, which will be of uniform quality, homogeneous, and finished with edges that shall be sharply defined and as firm as the body of the brick without the necessity of repressing to accomplish such object.

To this end it consists of the method and apparatus, as hereinafter described and claimed, for giving to the clay, first, a simultaneous top and bottom pressure for developing the brick, removing the air and surplus clay, and particularly for projecting and developing the edges of the brick; second, an upward pressure to level and solidify the edges of the brick, and, finally, a simultaneous top and bottom pressure to give the brick and its edges a solid uniform compact quality and shape.

It also consists of a novel means of expelling the air and surplus clay on the first top and bottom pressure of the brick.

My improvements are illustrated in the accompanying drawings, in which—

Figure 1 is a plan; Fig. 2, a vertical cross-section on line $x\ x$ of Fig. 1; Fig. 3, a horizontal section on line $x\ x$ of Fig. 2. Fig. 4 is a vertical longitudinal section of part of the machine. Fig. 5 is a top view of the mold table and boxes, two of the boxes being removed. Fig. 6 is a detail, being a plan of the lock and latch; Fig. 7, a detail, being a vertical section through one of the mold-boxes. Fig. 8 is a detail, being a plan for the devices for removing the brick from the mold-table; Fig. 9, an enlarged detail showing the roller-brush. Fig. 10 is a detail view of one of the upper pressure-levers and bracket; Fig. 11, a cross-section on line $x\ x$ of Fig. 10. Fig. 12 is a detail, being a side view showing the movable portion of the track and its support. Fig. 13 is a detail, being a side view of the period-gear and lock and latch. Fig. 14 is a detail showing one of the pressure-levers on the eccentric-pin. Fig. 15 is a detail showing the eccentric-pin used as a fulcrum for the pressure-levers; Figs. 16 and 17, details, being side and end views, respectively, of one of the upper plungers; Figs. 18 and 19, details of face-plates.

My improvements in the apparatus have been made in that class of machines having an intermittently-rotating mold-table with sets of molds in which the clay is subjected to successive pressures in the molds by followers, and which are provided with devices for removing the finished brick.

Referring to the drawings, A represents the bed-plate.

B are three posts rising from the bed-plate.

C is a main truss, one end of which rests upon one of the posts B, and is secured by a bolt passing through the posts and bed-plate.

D D' are two branch trusses bolted at one end to the main truss, with the other ends resting upon two of the posts B, and secured thereto by bolts which pass through the posts and bed-plate.

E is a mold-table, provided with gear upon its periphery, and is provided with six mold-boxes F, each of which, as shown, is double, and which are secured to the table. The table is provided with openings over which the mold-boxes are placed. Each box is also provided with a steel lining $a$ and a partition $b$.

$c$ are metal plates, which are bolted to the tops of the mold-boxes.

G, Fig. 7, are guides for the follower-stems, which guides are made independent and are secured to the bottoms of the mold-boxes by means of bolts. These guides are provided with recesses to permit the insertion from above of the rollers at the lower end of the follower-stems.

H are the followers. As shown, a follower consists of a head $e$, on the stem of which is secured a removable plate $f$. The lower end of each follower-stem H is provided with a roller $g$.

I is a track for the rollers $g$. The mold-table is provided with strengthening-ribs $h$ on the under side, and with a hub at the center, which rotates upon a pivot J, supported by three legs K, the lower ends of which are bolted to the bed-plate.

L is a hood on top of the main truss, held in place by the center bolt M, the object of the hood being in part to take a portion of the strain from the bolts which connect the branch trusses with the main truss.

I make a portion of the track upon which the rollers $g$ travel adjustable vertically for the purpose of regulating the amount of clay to be fed to the molds. N, Figs. 3 and 12, represents the main part of this portion of the track. $i$ is the other part, which is hinged to N. The under side of this part N is, as shown, provided with three inclines, which rest upon three corresponding inclines $k$ in the support O. On the side N is a rack $l$, with which a worm-screw $m$ engages, which worm can be operated by a hand-wheel $n$. By rotating this worm-wheel the movable part N can be raised and lowered, the inclines $j$ moving up and down on the inclines $k$. By raising or lowering this part N the position of the lower followers H when at rest in the mold-boxes can be varied for the purpose of regulating the amount of clay to be fed to the mold-boxes. The main part of the hinged piece $i$ is only half the width of the track, and at this point one-half of the wheels $g$ will have a support in whatever position the part $i$ be placed. When the part N is at its lowest position this part $i$ will be horizontal. As the part N is raised the part $i$ assumes an inclined position. N is provided with a slot $o$, Fig. 3, into which passes a pin which serves as a guide.

P is a hopper, pivoted to the machine.

Q, Fig. 3, is a gear-wheel driven by a pinion. (Not shown.)

R is the main shaft, driven by the wheel Q.

S is a miter-wheel on the shaft R.

T, Fig. 4, is a vertical shaft, on the lower end of which is a miter-wheel U, engaging with the miter-wheel S.

$p$ is a face-plate on the top of hub $q$, which hub is keyed to the shaft T.

$d'$ is a mutilated pinion secured to the hub $q$. (See Figs. 1 and 4.)

A', Fig. 1, is a rod connected at one end to the pivoted hopper and at the other end to the coiled spring $e'$.

$f'$ is a lever, one end of which is pivoted to the bar A' and the other end engages with the teeth of the mutilated pinion $d'$.

B', Fig. 5, is a mutilated pinion engaging with the mold-table, and being so arranged that one revolution of the pinion B' gives to the mold-table one-sixth of a revolution.

C' is a cam, which is bolted to this mutilated gear. The plate which carries the cam is provided with slots, so that the cam can be adjusted on B'.

$D^2$ is a bar forked at its outer end and having upon its inner end, as shown, three teeth $h'$, which engage with notches $i'$, of which, as shown, there are five in the side of the mold-boxes.

E' is a bar, which is bolted to the fork of D'.

$j'$ is a latch pivoted at $k'$ to the frame and at $l^2$ to $D^2$, which latch has a hook $m'$ at its free end.

$n'$ is a roller supported on a pin, which is bolted to E', the roller being arranged in the groove of the cam C', Figs. 5 and 8.

F' is a counter-pressure plate pierced for the first and third pressure-plungers, and against which the brick are pressed from below in the second pressure.

I is a top pressure-plunger, which, in conjunction with lower followers H, is used to give the first top and bottom pressure. It is a double plunger consisting of pistons $a^2$ $a^3$, each of which is provided at its lower end with an inwardly-beveled plate $a^4$, secured thereto by means of a bolt $x'$, dowel-pins $x^2$, and an upper bracket composed of a bottom plate $x^3$, bolted to the head of the plunger and provided with arms $x^4$. 2 is a lever connected to said arms by means of a pin $x^5$, and fulcrumed on a post 3, cast on a branch of truss D. The lever 2 is connected to a vertical rod 4, which in turn is connected to bottom lever G' by rocking arms $G^3$. The pin $x^5$ passes through an elongated slot 5 in the lever 2 to give the lever an easy sliding and rocking movement thereon. The lever 2 raises the plunger by the pin $x^5$, but the downward pressure of the lever is exerted on a sliding gib $x^6$, which rests in the bracket between the arms $x^4$. That portion of the lever inclosing the pin $x^5$ swells so as to rest and rock on the gib when the downward pressure is exerted. The said pin thus only bears the weight of the plunger. The gib is secured to the lever at the point mentioned by means of a short screw $x^7$, a sufficient space being left around the screw-head to afford a slight rocking motion of the lever thereon. This arrangement of the parts, as shown and described, is to relieve the strain on the pin and prevent its breaking as the lever is alternately raised or depressed. The second pressure is an upward one, produced by the pressure of the followers H against the counter-pressure plate in the manner before described. The third or final pressure is a simultaneous top and bottom pressure, produced by a duplication of the same means as the first top and bottom pressure—namely, by plunger 7, lever 2', rod 4', levers $G^2$ $G^4$, except that the plunger 7 is not provided with a beveled pressure-plate. The object of the said beveled plate is to form in the first pressure, an upwardly-projecting fin all around the edge of the brick, as shown in Fig. 18. This fin is flattened on the second upward pressure, and thus a solid sharp edge, compact and firm as the rest of the brick, is obtained.

The air and surplus clay obtained on the first pressure find their egress through the plunger I by means of holes cut through the plunger. A pan Y is secured to the top edge of the plunger I and surrounds the same to catch and hold the surplus clay escaping from said holes.

On the face of the bottom plate of plunger 7, giving the top pressure on the third pressure, I form conical projections in order to impress the then finished brick with shallow perforations on one surface for the purpose of increasing the holding power of the mortar.

The operation of the machine, it is believed, will be understood without further description.

The advantages of giving the brick a first top and bottom pressure, at the same time forcing out the surplus air and clay through the plunger and developing an edge to the brick, are, I find, very great over the method of first giving but a single pressure to the brick and forcing the air and clay through holes in a pressure-plate in producing a thoroughly homogeneous brick with perfect edges. The final top and bottom pressures are also advantageous in giving the brick its final complete smooth solid condition.

The rods 4, for connecting the top and bottom levers for operating the top and bottom plungers, are connected to said levers by right and left hand screw-threads to engage the internally-screw-threaded socket-joints for the purpose of increasing or decreasing the pressure on the brick.

I' are recesses in the upper follower, formed by cutting out the sides of the follower down to near its bottom, for the purpose of receiving lubricating material. Oil is preferably used, which oozes down the sides of the mold-box and head of plunger.

The pressed brick are removed from the mold-table by the movement of the sweep-box a', which is operated by the devices shown, being the cam r, roller t, bar V, connecting-rod v, bell-crank lever W, and link w. There is a roller at the end of the link w, which moves in the slot in the guide c'. The roller b' in the sweep-box a' is composed of sheepskin or other suitable material, placed upon a shaft and adapted to receive oil for oiling the upper surface of the followers, which is done when the sweep-box is removing brick and returning to its place.

What I claim is—

1. The art of manufacturing brick, consisting, first, in supplying the clay to the mold; second, giving the clay a simultaneous top and bottom plunger-pressure, whereby the brick is developed; third, giving the clay a single plunger-pressure from one side of the mold, and, fourth, giving the clay a final simultaneous top and bottom plunger-pressure to complete, solidify, and finish the brick, substantially as described.

2. In a brick-machine, the combination, with a top plunger, a bottom follower, the top pressure-lever, the bottom pressure-lever, and the vertical right and left screw-threaded rods, screw-threaded sockets, and connecting-arms, substantially as and for the purpose specified.

3. In a brick-machine, in combination with the top plunger, provided with a bracket having upwardly-extending arms, a pin extending through said arms, a gib within said arms below said pin, and a pressure-lever fulcrumed at one end to the machine, pivoted to said pin and rocking on said gib, and rod-and-lever mechanism to which the opposite end of said pressure-lever is connected, substantially as and for the purpose specified.

4. In a brick-machine, the top plunger provided with holes extending through it from top to bottom for the escape of air and surplus clay from the mold, and a pan connected with the top of the plunger to receive the clay forced through the plunger, substantially as described.

5. The upper follower, provided with recesses I', formed by cutting out the sides of the follower down to near its bottom for the purpose of receiving lubricating material, substantially as described.

In testimony whereof I affix my signature in presence of two witnesses.

WM. L. GREGG.

Witnesses:
R. E. EGGLESTON,
GEO. W. CLOTHIER.